United States Patent Office 3,729,502
Patented Apr. 24, 1973

3,729,502
PROSTANOIC ACID DERIVATIVES
Philip F. Beal III and John E. Pike, Kalamazoo, Mich., assignors to The Upjohn Company, Kalamazoo, Mich.
No Drawing. Continuation-in-part of application Ser. No. 480,107, Aug. 16, 1965, and a division of application Ser. No. 520,876, Jan. 17, 1966, both now abandoned.
This application Oct. 16, 1970, Ser. No. 81,593
Int. Cl. C07c 61/32, 69/74
U.S. Cl. 260—468 D    11 Claims This application is a continuation-in-part of our copending application Ser. No. 480,107, filed Aug. 16, 1965, and a division of our copending application Ser. No. 520,876, filed Jan. 17, 1966, and now abandoned.

This invention relates to novel compositions of matter and to methods for producing them. In particular, this invention relates to certain novel derivatives of prostanoic acid.

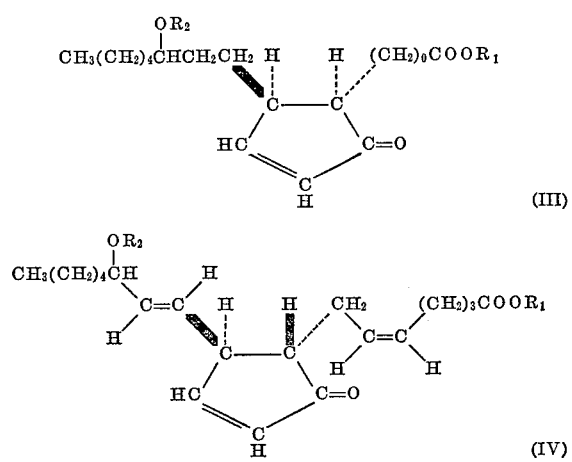

The hydrogen atoms attached to C–8 and C–12 in Formula I are in trans configuration. See Bergström et al., J. Biol. Chem., 238, 3555 (1963) and Horton, Experientia, 21, 113 (965).

Some of the novel compounds of this invention can be described by the formula:

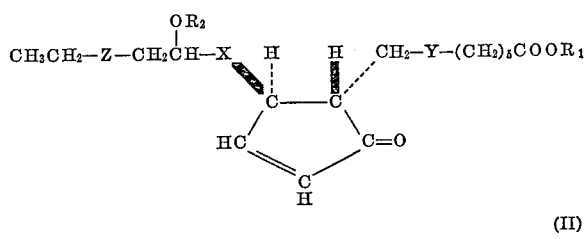

(II)

wherein X, Y, and Z are —CH$_2$CH$_2$—, or X is trans-CH=CH—, Y is cis-CH=CH—, and Z is —CH$_2$CH$_2$— or cis-CH=CH—, wherein R$_1$ is hydrogen, hydrocarbyl, or a pharmacologically acceptable cation, and wherein R$_2$ is hydrogen or carboxyacyl. This Formula II encompasses the following:

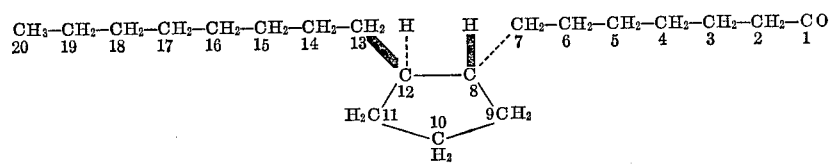

(III)

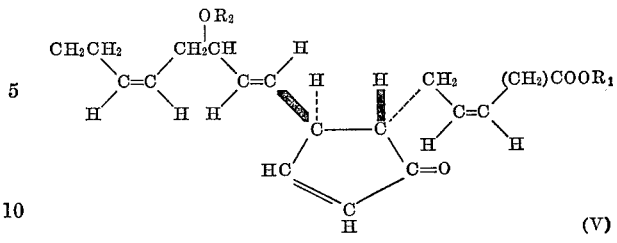

(IV)

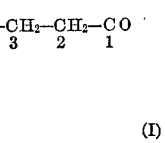

(V)

wherein R$_1$ and R$_2$ are as defined above. Hereinafter, reference to compounds of Formula II includes compounds of Formulas III, IV, and V.

Some of the novel compounds of this invention can be described by the formula:

(I)

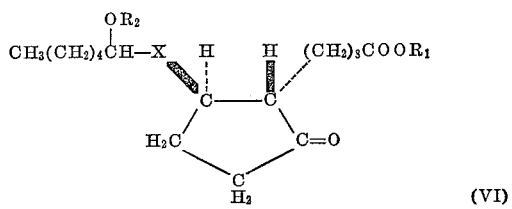

(VI)

wherein X is —CH$_2$CH$_2$— or trans-CH=CH—, and wherein R$_1$ and R$_2$ are as defined above.

Some of the novel compounds of this invention can be described by the formula:

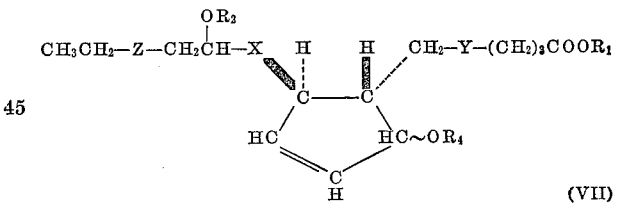

(VII)

wherein X, Y, and Z are —CH$_2$CH$_2$—, wherein X is trans-CH=CH—, and Y and Z are —CH$_2$CH$_2$—, or wherein X is trans-CH=CH—, Y is cis-CH=CH—, and Z is —CH$_2$CH$_2$—or cis-CH=CH—, wherein R$_1$ and R$_2$ are as defined above, and wherein R$_4$ is hydrogen or carboxyacyl, with the proviso that if R$_4$ is carboxyacyl, R$_2$ is also carboxyacyl, and wherein ~ is a generic expression denoting an alpha or a beta configuration for the OR$_4$ moiety.

Some of the novel compounds of this invention can be described by the formula:

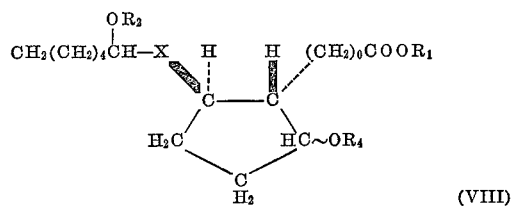

(VIII)

wherein X is —CH$_2$CH$_2$— or trans-CH=CH—, wherein R$_1$, R$_2$, and R$_4$ are as defined above, with the proviso that if R$_4$ is carboxyacyl, R$_2$ is also carboxyacyl, and wherein ∼ is a generic expression denoting an alpha or a beta configuration for the $OR_4$ moiety.

In compounds of Formulas VII and VIII, the $OR_4$ moiety is in alpha configuration when it is on the same side of the cyclopentane ring plane (carbons 8, 9, 10, 11, and 12) as the C–7, C–8 bond, and is in beta configuration when it is on the plane side opposite to the C–7, C–8 bond. Formulas VII and VIII encompass 9-alpha compounds, 9-beta compounds, and mixtures of the 9-alpha and 9-beta isomers (epimers).

Preferably, the hydrocarbyl moiety in compounds of Formulas II, VI, VII, and VIII contains one to about 40 carbon atoms. Among the hydrocarbyl moieties, lower alkyl is especially preferred. Preferably, the carboxyacyl moiety or moieties in compounds of Formulas II, VI, VII, and VIII contain one to about 12 carbon atoms. Among the carboxyacyl moieties, lower alkanoyl is especially preferred.

Examples of lower alkyl, i.e., with one to about 8 carbon atoms, are methyl, ethyl, propyl, butyl, pentyl, hexyl, heptyl, octyl, and isomeric forms thereof. Examples of other hydrocarbyl moieties within the scope of this invention are nonyl, undecyl, allyl, crotyl, 3-butenyl, 5-hexenyl, propargyl, 4-pentynyl, cyclopentyl, 4-tert-butylcyclohexyl, cyclooctyl, benzyl, 2-naphthylmethyl, and the like.

Examples of lower alkanoyl, i.e., with one to about 8 carbon atoms, are formyl, acetyl, propionyl, butyryl, valeryl, hexanoyl, heptanoyl, octanoyl, and isomeric forms thereof. Examples of other carboxyacyl moieties within the scope of this invention are decanoyl, crotonyl, cyclohexanecarbonyl, 3-cyclohexenecarbonyl, phenylacetyl, p-chlorophenoxyacetyl, succinyl, benzoyl, p-nitrobenzoyl, naphthoyl, furoyl, 3-pyridinecarbonyl, phthaloyl, and the like.

Pharmacologically acceptable cations within the scope of $R_1$ in Formulas II, VI, VII, and VIII can be the cationic form of a metal, ammonia, or an amine, or can be quaternary ammonium ions. Especially preferred metal cations are those derived from the alkali metals, e.g., lithium, sodium, and potassium, and from the alkaline earth metals, e.g., magnesium, calcium, strontium, and barium, although the cationic form of other metals, e.g., aluminum, zinc, iron, and silver is within the scope of this invention.

Pharmacologically acceptable amine cations within the scope $R_1$ in Formulas II, VI, VII, and VIII can be derived from primary, secondary, or tertiary amines. Examples of suitable amines are methylamine, dimethylamine, trimethylamine, ethylamine, dibutylamine, triisopropylamine, N-methylhexylamine, decylamine, allylamine, crotylamine, cyclopentylamine, dicyclohexylamine, benzylamine, dibenzylamine, α-phenylethylamine, β-phenylethylamine, ethylenediamine, diethylenetriamine, and like lower-aliphatic, lower-cycloaliphatic, and lower-araliphatic amines containing up to and including about 18 carbon atoms, as well as heterocyclic amines such as piperidine, morpholine, pyrrolidine, piperazine, and lower-alkyl derivatives thereof, such as 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups such as mono-, di-, and triethanolamine, ethyldiethanolamine, N-butylethanolamine, 2-amino-1-butanol, 2-amino-2-ethyl - 1,3 - propanediol, 2-amino-2-methyl - 1-propanol, tris(hydroxymethyl)aminomethane, N-phenylethanolamine, N-(p-tert-ampylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations within the scope of $R_1$ in Formulas II, VI, VII, and VIII are tetramethylammonium, tetraethylammonium, benzyltrimethylammonium, phenyltriethylammonium, and the like.

The novel prostanoic acid derivatives of Formulas II, VI, VII, and VIII exhibit vasodepressor activity in the normotensive state when assayed in dogs prepared according to the technique of Lee et al., Circulation Res., 13, 359 (1963). These dogs are anesthetized, vagotomized, and pentolinium treated (AVPT dogs). The material to be assayed is administered in ethyl alcohol which is diluted to 1 to 10 with physiological saline or 5 percent dextrose for intravenous injection.

Because of this vasodepressor activity, the novel Formulas II, VI, VII, and VIII compounds are valuable therapeutic agents for the treatment of hypertension, in normalizing serum lipids and thus reducing the danger of ischaemic heart disease, and in treating central nervous system disorders, in mammals, including man. These compounds are administered by intravenous infusion of sterile isotonic saline solutions at the rate of about 0.01 to about 10, preferably, about 0.1 to about 0.2, micrograms per kilogram of animal weight per minute.

It is known that other prostanoic acid derivatives lower systemic arterial blood pressure when injected intravenously, especially those substances known as the prostaglandins, e.g., $PGE_1$, $PGE_2$, and $PGE_3$. See Horton, ibid. Those substances, however, also have a strong stimulatory action on smooth muscle and antagonize epinephrine-induced mobilization of free fatty acids. It was quite surprising and unexpected, therefore, that the novel Formula II, VI, VII, and VIII compounds of this invention have far less smooth muscle stimulatory effect as shown, for example, by tests on strips of guinea-pig and rabbit smooth muscle than, for example, $PGE_1$, and far less antagonism of epinephrine-induced mobilization of free fatty acids than, for example, $PGE_1$. Therefore, the novel Formula II, VI, VII, and VIII compounds of this invention are especially useful for the above-described purposes because they are substantially more specific in their action and result in substantially lesser side effects. To take full advantage of the physiological specificity of the novel compounds of this invention, it is preferred that they be administered in essentially pure form. Even small amounts of unchanged reactant or side reaction products can cause unwanted animal organism responses.

The novel Formula II, VI, VII, and VIII compounds are also useful because they can be administered to laboratory animals, preferably rats, to produce animals containing high levels of the compounds. Such animals can then serve as test animals in the search for and study of compounds which are antagonists of the administered compounds and which, for that reason, would be useful in reversing the effects of inadvertent overdoses of the extremely potent novel Formula II, VI, VII, or VIII compounds and in the treatment of allergic conditions. For that purpose, the Formula II, VI, VII, or VIII compound is advantageously administered to the test animal by continuous intravenous infusion in sterile saline solution, at the rate of about 0.01 to about 10, preferably 0.05 to 0.2, micrograms per kilogram of animal weight per minute until the desired level of compound has been reached or until the desired response in the animal has been obtained. Infusion can then be continued or stopped depending on the particular use to be made of the test animal.

For any of the above purposes, there can be used any of the forms encompassed by Formulas II, VI, VII, and VIII, including both the 9α and the 9β form of any particular Formula VII or Formula VIII compound, or mixtures of those two forms. It is especially preferred, however, that hydrocarbyl and carboxyacyl, when present in compounds of Formula II, VI, VII, or VIII, be lower alkyl and lower alkanoyl, respectively.

In addition to the above uses, the essentially pure form of the novel Formula II, VI, VII, or VIII compounds wherein $R_1$, $R_2$, and $R_4$ are each hydrogen can be used as assay standards in the study of the possible presence and content of these substances in animal tissues, plant tissues, and in fermentation broths and other bioconversion reaction mixtures.

The novel Formula II prostanoic acid derivatives of this invention wherein $R_1$ is hydrogen or hydrocarbyl, as well as prostanoic acid derivatives of the formula:

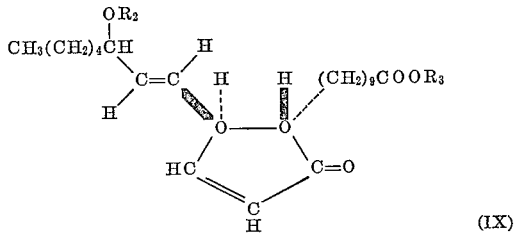

(IX)

wherein $R_2$ is as defined above and $R_3$ is hydrogen or hydrocarbyl, can be prepared by mixing a reactant of the formula:

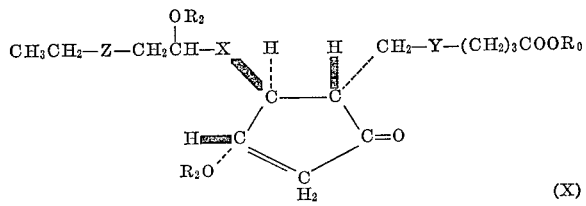

(X)

wherein $R_2$ and $R_3$ are as given above, and wherein X, Y, and Z are —$CH_2CH_2$—, wherein X is trans-CH=CH—, and Y and Z are —$CH_2CH_2$—, or wherein X is trans-CH=CH—, Y is cis-CH—CH—, and Z is —$CH_2CH_2$— or cis-CH=CH—, with a carboxylic acid, and maintaining the mixture until a substantial proportion of the Formula X reactant is transformed to the desired prostanoic acid derivative product:

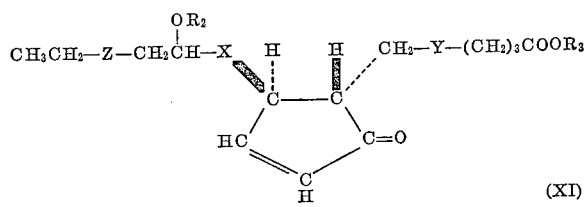

(XI)

wherein $R_2$, $R_3$, X, Y, and Z are as given above for Formula X.

Prostanoic derivatives of Formula XI encompass those of Formula IX, and those of Formula II wherein $R_1$ is hydrogen or hydrocarbyl. It is not, of course, advantageous to attempt direct preparation of Formula XI compounds wherein $R_3$ is a cation by the novel process of this invention because the carboxylic acid reagent would interact with the carboxylate anion moiety of the salt. If the salt form of the Formula XI product is desired, i.e., wherein $R_3$ is a cation, it is preferred to prepare that form from the corresponding free acid, i.e., wherein $R_3$ is hydrogen. Other acids than carboxylic acids, for example, hydrochloric acid, sulfuric acid, and perchloric acid, can be used for this transformation of Formula X compounds to Formula XI compounds, but it is usually preferred to use the carboxylic acid because higher yields of relatively pure Formula XI compounds are usually obtained thereby.

Reactants of Formula X are known in the art or can be prepared by methods known in the art. See, for example, Samuelsson, Angew. Chem. Inter. Ed. Eng., 4, 410 (1965), and references cited therein. The Formula X reactant wherein $R_2$ and $R_3$ are both hydrogen, X is trans-CH=CH—, and Y and Z are both —$CH_2CH_2$—, is known as prostaglandin $E_1$ ($PGE_1$). The Formula X reactant wherein $R_2$ and $R_3$ are both hydrogen, X is trans-CH=CH—, Y is cis-CH=CH—, and Z is

—$CH_2CH_2$— is known as prostaglandin $E_2$ ($PGE_2$). The Formula X reactant wherein $R_2$ and $R_3$ are both hydrogen, X is trans-CH=CH—, and Y and Z are both cis-CH=CH— is known as prostaglandin $E_3$ ($PGE_3$). The Formula X reactants wherein X, Y, and Z are all —$CH_2CH_2$— can be prepared by catalytic hydrogenation of the other unsaturated compounds. See Bergström et al., J. Biol. Chem., 238, 3555 (1963) and U.S. Pat. No. 3,069,322, for example.

Although substantially any carboxylic acid can be used as a reagent in the novel process of this invention, it is preferred to use a lower alkanoic acid, i.e., with two to about 8 carbon atoms. Examples of lower alkanoic acids are acetic acid, propionic acid, butyric acid, valeric acid, hexanoic acid, heptanoic acid, octanoic acid, and isomeric forms thereof, e.g., pivalic acid. Especially preferred as a reactant is acetic acid. Other suitable acids are decanoic acid, crotonic acid, chloroacetic acid, succinic acid, tartaric acid, cylohexaneacetic acid, maleic acid, adipic acid, benzoic acid, p-nitrobenzoic acid, phenylacetic acid, nicotinic acid, and the like.

It is often advantageous, especially with such lower alkanoic acids as acetic acd, to add a small amount of water to the reaction mixture, preferably about one to about 25 percent by weight of the acid reagent. For reasons not completely understood, the water appears to accelerate the reaction and to produce better yields of higher purity product. This is especially true when $R_2$ and $R_3$ are hydrogen in the Formula X prostanoic acid derivative reactant.

The amount of the carboxylic acid reagent is not critical although it is usually advantageous to use at least one molecular equivalent of the acid reagent per molecular equivalent of the Formula X prostanoic acid derivative reactant. It is preferred to use a substantial excess of the carboxylic acid reagent, e.g., about 5 to about 5,000 molecular equivalents or even more, per molecular equivalent of the Formula X reactant, especially when the carboxylic acid reagent is sufficiently volatile to be removed by evaporation or distillation at reduced pressure.

When the carboxylic acid reactant is a liquid at the reaction temperature, excess acid can act as a reaction diluent. An inert diluent can also be added, and use of one is preferred when the acid reactant is a solid at the reaction temperature. Examples of suitable inert diluents are lower alkanols, e.g., ethanol and butanol; lower alkyl lower alkanoates, e.g., ethyl acetate and methyl butyrate; lower alkanones, e.g., acetone and diethyl ketone; dioxane; dialkyl formamides, e.g., dimethyl formamide; dialkyl sulfoxides, e.g., dimethyl sulfoxide; and the like.

The preferred reaction temperature range is about 40° to about 150° C. Especially preferred is the range about 50° to about 100° C. The time necessary to transform a substantial proportion of the Formula X reactant to the desired Formula XI prostanoic acid derivative product will depend on such factors as the reaction temperature, the nature of the $R_2$, $R_3$, X, Y, and Z in the Formula X reactant, the nature and amount of the carboxylic acid reagent, and the nature and amount of the diluent, if one is used. When acetic acid containing 10 percent by weight of water is used with the Formula X reactant wherein X, Y, and Z are —$CH_2CH_2$—, and $R_2$ and $R_3$ are both hydrogen, heating at 60° C. for 18 hours gives satisfactory results.

The Formula XI products of the novel process of this invention are usually less polar than the Formula X reactants. For that reason, a product and the corresponding reactant can easily be separated by chromatography, preferably by thin layer chromatography, for example, by the procedures of Green et al., J. Lipid Research, 5, 117 (1964). For example, when $R_2$ and $R_3$ in Formula X are both hydrogen, thin layer chromatography on silica gel with a mixture of acetic acid-methanol-chloroform, 5:5:90 by volume gives a satisfactory separation.

By that thin layer chromatography, the course of the novel process of this invention can readily be followed by observing the gradual appearance of the desired Formula XI product and the gradual disappearance of the Formula X reactant on thin layer chromatograms. Small aliquots of the reaction mixture can be taken during the reaction. When a chromatographic spot corresponding to the Formula X reactant no longer appears, the reaction is complete.

The desired Formula XI prostanoic acid derivative product can be isolated from the reaction mixture, if desired, by comventional methods, for example, by evaporation of diluent and excess carboxylic acid, if the latter is sufficiently volatile, or by conventional chromatographic or selective extraction procedures. The Formula XI product can also be further purified, if desired, by conventional procedures, preferably by chromatography.

An alternative method for producing Formula XI prostanoic acid derivatives wherein X, Y, and Z are all —$CH_2CH_2$—, i.e., compounds of Formula III, comprises mixing diimide with compounds of the formula:

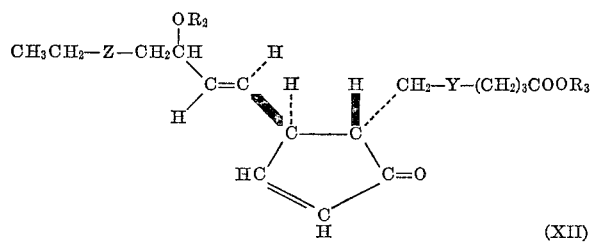

wherein Y and Z are both —$CH_2CH_2$— or both cis-CH=CH—, or wherein Y is cis-CH=CH— and Z is —$CH_2CH_2$—, and wherein $R_2$ and $R_3$ are as given above. Diimide will also saturate any isolated olefinic and acetylenic unsaturation in $R_2$ carboxyacyl and $R_3$ hydrocarbyl moieties. Hence, an appropriately larger amount of diimide should be used when such unsaturation is present in the Formula XII reactant. When such unsaturated $R_2$ and/or $R_3$ moieties are desired in the Formula XI product, it is preferred that the Formula XI product wherein $R_2$ and/or $R_3$ are hydrogen be prepared and then appropriately carboxylated and/or esterified as described hereinafter.

Diimide is known in the art. See, for example, Fieser et al., "Topics in Organic Chemistry," Reinhold Publishing Corp., New York, pp. 432–434 (1963) and references cited therein. Diimide is unstable and is usually generated in contact with the olefinic substance to be reduced. It was found that the 10,11-double bond in Formula XII prostanoic acid derivatives is not reduced by diimide, but the other carbon-carbon double bonds at C–13, C–5, and C–17 are reduced.

For the diimide reduction of Formula XII compounds, the general procedure described by van Tamelen et al., J. Am. Chem. Soc., 83, 3726 (1961) is usually satisfactory. The Formula XII reactant is mixed with a salt of azodiformic acid, preferably an alkali metal salt such as the disodium or dipotassium salt, in the presence of an inert diluent, preferably a lower alkanol such as methanol or ethanol, and preferably in the absence of substantial amounts of water. At least one molecular equivalent of the azodiformic acid salt is used for each molecular carbon-carbon double bond equivalent of the Formula XII reactants, and preferably about 1.1 to about 10 molecular equivalents of the salt per double bond equivalent of the reactant. The resulting suspension is then stirred, preferably with exclusion of oxygen, and the mixture is made acid, advantageously with a carboxylic acid such as acetic acid. When a Formula XII reactant wherein $R_3$ is hydrogen is used, that carboxylic acid reactant also serves to acidify an equivalent amount of the azodiformic acid salt. A reaction temperature in the range about 10° to about 40° C. is usually suitable. Within that temperature range, the reaction is usually complete within less than 24 hours. The desired Formula III product can then be isolated by conventional methods, for example, evaporation of the diluent, followed by separation from inorganic materials by solvent extraction. The Formula III product can then be purified, if desired, as described above.

The novel Formula VI prostanoic acid derivatives of this invention wherein $R_1$ is hydrogen or hydrocarbyl and $R_2$ is hydrogen or carboxyacyl can be prepared by catalytic hydrogenation of a Formula IX prostanoic acid derivative reactant. When one molecular equivalent of the Formula IX reactant is thus contacted with about one molecular equivalent of hydrogen, a mixture of Formula VI products is obtained, i.e., a Formula VI compound wherein X is —$CH_2CH_2$— and a Formula VI compound wherein X is trans-CH=CH—. When a substantially larger amount of hydrogen than one molecular equivalent is used, only the Formula VI product wherein X is —$CH_2CH_2$— can be isolated. When the $R_1$ and/or the $R_2$ moiety contains olefinic or acetylenic unsaturation, an appropriately larger amount of hydrogen should be used. If such unsaturated $R_2$ and/or $R_2$ moieties are desired in the Formula VI product, it is preferred that the Formula VI compound wherein $R_1$ and/or $R_2$ are hydrogen be prepared and then appropriately esterified and/or carboxyacylated as described hereinafter.

Palladium catalysts, especially on a carbon carrier, are preferred for this catalytic hydrogenation. It is also preferred that the hydrogenation be carried out in the presence of an inert liquid diluent, for example, methanol, ethanol, dioxane, ethyl acetate, and the like. Hydrogenation pressures ranging from about atmospheric to about 50 p.s.i., and hydrogenation temperatures ranging from about 10° to about 100° C. are preferred.

The Formula VI product or mixture of products can be isolated by conventional techniques, for example, removal of the catalyst by filtration, followed by evaporation of the solvent. The product can then be purified, advantageously by chromatography. Chromatography can also be used to separate the mixture of Formula VI products obtainable by this hydrogenation into the two desired components, i.e., X in Formula VI being either:

—$CH_2CH_2$— or trans-CH=CH—

Silica gel and diatomaceous earth are especially preferred as the chromatography solids. The Formula VI compound wherein X is —$CH_2CH_2$— is usually less polar than the Formula VI compound wherein X is trans-CH=CH—, and tends to be eluted more rapidly from chromatographic columns than the latter compound.

Formula VI compounds wherein $R_1$ is a cation are preferably prepared from the corresponding Formula VI free acid, i.e., wherein $R_1$ is hydrogen, rather than by catalytic hydrogenation of the corresponding Formula IX compound wherein $R_3$ is a cation.

The Formula VII and Formula VIII 9-hydroxyprostanoic acid derivatives wherein $R_1$ is hydrogen or hydrocarbyl, wherein $R_2$ is hydrogen or carboxyacyl, and wherein $R_4$ is hydrogen are prepared by reduction of the corresponding Formula XI and Formula VI 9-oxoprostanoic acid derivatives, respectively, with a borohydride or with lithium aluminum (tri-tert-butoxy)hydride. The Formula VII and Formula VIII 9-hydroxyprostanoic acid compounds wherein $R_1$ in each formula is a cation are preferably prepared from the corresponding Formula VII and Formula VIII free acid, respectively, i.e., wherein $R_1$ in each formula is hydrogen, rather than by reduction of the salt form of Formula XI or Formula VI reactants. When Formula VII or Formula VIII compounds wherein $R_1$ is hydrocarbyl and/or $R_2$ is carboxyacyl are desired, it is preferred to prepare those by esterification of the corresponding Formula VII or Formula VIII compounds wherein $R_1$ and $R_2$ are hydrogen rather than by direct reduction of the Formula VII or Formula VIII esters, acylates, or ester-acylates, although those latter reductions can be carried out.

The borohydride or lithium aluminum (tri-tert-butoxy)-hydride transforms the 9-oxo group of each Formula XI and each Formula VI reactant to a 9-hydroxy group. Carboxyacylation of that new 9-hydroxy group will occur during carboxyacylation of a C–15 hydroxy group. Hence, if it is desired to prepare a Formula VII or Formula VIII compound wherein $R_2$ is carboxyacyl and $R_4$ is hydrogen or a different carboxyacyl, the reduction must be carried out on the Formula XI or Formula VI reactant wherein $R_2$ already is the desired carboxyacyl moiety.

These reductions of the 9-oxoprostanoic acid can be carried out by methods known in the art for borohydride reductions of other prostanoic acid derivatives. See, for example, Bergström et al., Acta Chem. Scand., 16, 969 (1962) and Anggard et al., J. Biol. Chem., 239, 4101 (1964). Sodium borohydride, potassium borohydride, or lithium aluminum (tri-tert-butoxy)hydride are preferred for these reductions. Lower alkanols, e.g., methanol and ethanol, are preferred as reaction solvents, although other solvents, e.g., dioxane and diethylene glycol dimethyl ether can also be used, especially in combination with the lower alkanol.

Although 0.25 molecular equivalent of the borohydride or lithium aluminum (tri-tert-butoxy)hydride reducing agent is sufficient to reduce one molecular equivalent of the Formula XI or Formula VI ketone reactant, it is preferred to use an excess of the reducing agent, preferably about 1 to about 15 molecular equivalents of reducing agent per molecular equivalent of the ketone reactant. It is preferred to add a solution or suspension of the reducing agent to the ketone reactant, although the reverse order can also be used. A reaction temperature in the range about 0° to about 50° C. is usually satisfactory. At about 25° C., the desired reaction is usually complete in about 0.5 to 2 hours. The resulting complex compound is then transformed to the desired product in the usual manner by treatment with aqueous acid, advantageously dilute hydrochloric acid.

The desired Formula VII or Formula VIII reduction product can be isolated by conventional techniques, for example, evaporation of the reaction solvent and extraction of the residual aqueous mixture with a water-immiscible solvent, for example, diethyl ether. Evaporation of the latter solvent then gives the desired product.

These borohydride or lithium aluminum (tri-tert-butoxy- hydride reductions of the 9-oxo group of Formula IX and Formula VI reactants each produce a mixture of a C–9α hydroxy compound and an isomeric (epimeric) C–9β-hydroxy compound. These mixtures of isomeric C–9 hydroxy compounds can be used for the purposes described hereinbefore for compounds of Formulas VII and VIII. Alternatively, the isomeric compounds in a pair of C–9 hydroxy compounds can be separated from each other by methods known in the art for the separation of analogous pairs of isomeric prostanoic acid derivatives. See, for example, Bergström et al., Acta Chem. Scand., 16, 969 (1962). Granström et al., J. Biol. Chem., 240, 457 (1965), and Green et al., ibid. Especially preferred as separation methods are partition chromatographic procedures, both normal and reversed phase, thin layer chromatography, and countercurrent distribution procedures.

The Formulas II, VI, VII, and VII prostanoic acid derivatives of this invention wherein any or all of $R_1$, $R_2$, and $R_4$ are hydrogen can be transformed into various types of esters, for example, compounds of Formulas II, VI, VII, and VIII wherein $R_1$ is a hydrocarbyl moiety and $R_2$ and $R_4$ are hydrogen, wherein $R_2$ and $R_4$ are carboxyacyl moieties, and $R_1$ is hydrogen, and wherein $R_1$ is a hydrocarbyl moiety and $R_2$ and $R_4$ are carboxyacyl moieties.

Esterification of the carboxyl moiety in Formulas II, VI, VII, and VIII prostanoic acid derivatives wherein $R_1$ is hydrogen, and $R_2$ and $R_4$ are hydrogen or carboxyacyl can be accomplished by interaction of the free acid with the appropriate diazohydrocarbon. For example, when diazomethane is thus used, methyl esters are produced. Similar use of diazoethane, diazobutane, 1-diazo-2-ethylhexane, cyclohexyldiazomethane, phenyldiazomethane, 1-diazo-2-propene, and the like gives ethyl, butyl, 2-ethylhexyl, cyclohexylmethyl, benzyl, allyl, and like esters of the prostanoic acid derivatives.

Esterification with diazohydrocarbons is carried out by mixing a solution of the diazohydrocarbon in a suitable inert solvent, preferably diethyl ether, with the prostanoic acid reactant, advantageously in the same or a different inert diluent. After the esterification reaction is complete, the solvent is removed by evaporation and the ester purified if desired by conventional methods, preferably by chromatography. It is preferred that contact of the acid reactants with the diazohydrocarbon be no longer than necessary to effect the desired esterfiication, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

An alternative method for esterification of the carboxyl moiety of Formulas II, VI, VII, and VIII prostanoic acid derivatives comprises transformation of the free acid to the corresponding silver salt, followed by interaction of that salt with a hydrocarbyl iodide. Examples of suitable iodides are methyl iodide, ethyl iodide, butyl iodide, isobutyl iodide, tert-butyl iodide, decyl iodide, benzyl iodide, cyclohexyl iodide, crotyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

Carboxyacylation of the hydroxy moiety or moieties in Formulas II, VI, VII, and VIII prostanoic acid derivatives wherein $R_1$ is hydrogen or hydrocarbyl and $R_2$ and/or $R_4$ are hydrogen is accomplished by interaction of the hydroxy compound with a carboxyacylating agent, preferably a carboxylic acid anhydride, for example, the anhydrides of alkanoic, cycloalkanoic, alkenoic, cycloalkenoic, aralkanoic, aromatic, and heterocyclic carboxylic acids. For example, use of acetic anhydride gives the corresponding acetate. Similar use of propionic anhydride, butyric anhydride, isobutyric anhydride, acrylic anhydride, crotonic anhydride, cyclohexanecarboxylic anhydride, benzoic anhydride, naphthoic anhydride, p-chlorophenoxyacetic anhydride, and furoic anhydride gives the corresponding carboxyacylates.

The carboxyacylation is advantageously carried out by mixing the hydroxy compound and the acid anhydride preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxane, can be added. It is preferred to use enough of the tertiary amine to neutralize the carboxylic acid produced by the reaction as well as any free carboxyl groups present in the hydroxy compound reactant.

The carboxacylation reaction is preferably carried out in the range about 0° to about 100° C. The necessary reaction time will depend on such factors as the reaction temperature and the nature of the anhydride and tertiary amine reactants. With acetic anhydride, pyridine, and a 25° C. reaction temperature, a 12 to 24-hour reaction time should be used.

The carboxyacylated product is isolated from the reaction mixture by conventional methods. For example, the excess anhydride can be decomposed with water, and the resulting mixture acidified and then extracted with a solvent such as diethyl ether. The desired carboxyacylate will usually be extracted by the ether and is recoverable therefrom by evaporation. If desired, the carboxyacylate can be purified by conventional methods, preferably by chromatography.

The above described methods for esterification and carboxyacylation of the novel Formulas II, VI, VII, and VIII prostanoic acid derivatives of this invention, wherein $R_1$ and/or $R_2$ and/or $R_4$ are hydrogen, can also be used to produce esters and carboxyacylates of Formula X compounds, wherein $R_2$ and/or $R_3$ are hydrogen. The latter, some of which are known in the art, can be used as reactants in one of the novel processes of this invention.

Each of the above-described Formula II, VI, VII, and VIII prostanoic acid derivatives wherein $R_1$ is hydrogen can be transformed in pharmacologically acceptable salts by neutralization with appropriate amounts of the corresponding inorganic or organic base, examples of which correspond to the cations listed above. These transformations can be carried out by a variety of procedures known in the art to be generally useful for the preparation of inorganic, i.e., metal of ammonium, salts, amine acid addition salts, and quaternary ammonium salts. The choice of procedure will depend in part upon the solubility characteristics of the particular salt to be prepared. In the case of the inorganic salts, it is usually suitable to dissolve the prostanoic acid derivative in water containing the stoichiometric amount of a hydroxide carbonate, or bicarbonate corresponding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone gives the solid inorganic salt if that form is desired.

To produce an amine salt, the prostanoic acid derivative can be dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it can usually be obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the prostanoic acid derivative with the stoichiometric amount of the corresponding quaternary ammonium hydroxide in water solution, followed by evaporation of the water.

The invention can be more fully understood by the following examples.

EXAMPLE 1

15-hydroxy-9-oxoprosta-10,trans-13-dienoic acid

A solution of $11\alpha,15$-dihydroxy-9-oxoprosta-trans-13-enoic acid (100 mg.) in a mixture of acetic acid (9 ml.) and water (1 ml.) was heated for 18 hours at 60° C. The course of the reaction was followed by testing aliquots with thin layer chromatography on silica gel, using acetic acid-methanol-chloroform, 5:5:90 by volume. The product is less polar than the reactant.

When the reaction was complete, the reaction mixture was evaporated at reduced pressure. The reisdue was dissolved in a mixture of equal volumes of diethyl ether and water. The diethyl ether layer was separated, dried with anhydrous sodium sulfate, and evaporated at reduced pressure to give 89 mg. of essentially pure 15-hydroxy-9-oxoprosta-10,trans-13-dienoic acid.

U.V. (ethanol solution): 218 m$\mu$.

I.R. (principal bands; mineral oil mull): 3400, 2640, 1700, 1580, 1180 cm.$^{-1}$.

Thin layer chromatography: A single spot with $R_F$ 0.6 using above solvent system.

N.M.R.: The spectrum shows two doublets centered at 6.17 and 7.52$\delta$; complex multiplet centered at 5–6$\delta$; two multiplets centered at 4.1$\delta$ and 3.25$\delta$. Spectrum taken with a Varian A–60 spectrophotometer on deuterochloroform solution with tetramethylsilane as internal standard.

Following the procedure of Example 1 but using in separate experiments, glacial acetic acid, 90% aqueous formic acid, propionic acid, 90% aqueous butyric acid, and 95% aqueous pivalic acid, rather than the 90% aqueous acetic acid, the same prostanoic acid derivative was formed.

EXAMPLE 2

15-hydroxy-9-oxoprosta-cis-5,10,trans-13-trienoic acid

Following the procedure of Example 1, $11\alpha,15$-dihydroxy-9-oxoprosta-5-cis,trans-13-dienoic acid was heated with 90% aqueous acetic acid. The reaction mixture was then evaporated, and the residue was purified to give essentially pure 15-hydroxy-9-oxoprosta-cis-5,10,trans-13-trienoic acid.

EXAMPLE 3

15-hydroxy-9-oxoprosta-cis-5,10,trans-13,cis-17-tetraenoic acid

Following the procedure of Example 1, $11\alpha,15$-dihydroxy-9-oxoprosta-cis-5,trans-13,cis-17-trienoic acid was heated with 90% acetic acid. The reaction mixture was then evaporated, and the residue was purified to give essentially pure 15-hydroxy-9-oxoprosta-cis-5,10,trans-13,cis-17-tetraenoic acid.

EXAMPLE 4

15-hydroxy-9-oxoprosta-10-enoic acid

Following the procedure of Example 1, $11\alpha,15$-dihydroxy-9-oxoprostanoic acid was heated with 90% acetic acid. The reaction mixture was then evaporated, and the residue was purified to give essentially pure 15-hydroxy-9-oxoprosta-10-enoic acid.

EXAMPLE 5

15-hydroxy-9-oxoprosta-10,trans-13-dienoic acid

A solution of $11\alpha,15$-dihydroxy-9-oxoprosta-trans-13-enoic acid (100 mg.) in a mixture of dimethylformamide (10 ml.), benzoic acid (1.0 g.), and water (0.1 ml.) was heated for 24 hours at 75° C. The reaction was followed as in Example 1. After completion of the reaction, the reaction mixture was evaporated at reduced pressure, and the residue was purified as in Example 1 to give essentially pure 15-hydroxy-9-oxoprosta-10,trans-13-dienoic acid with substantially the same properties given in Example 1.

Following the procedure of Example 5 but using, in separate experiments, dioxane and dimethyl sulfoxide in place of dimethyl formamide, the same prostanoic acid derivative is obtained.

Also following the procedure of Example 5 but using in place of the benzoic acid plus water, furoic acid plus water; succinic acid; adipic acid; phenylacetic acid plus water; p-nitrobenzenoic acid plus water; and crotonic acid, the same prostanoic acid derivative is obtained.

EXAMPLE 6

Methyl 15-acetoxy-9-oxoprosta-10,trans-13-dienoate

Following the procedure of Example 1, methyl $11\alpha,15$-diacetoxy-9-oxoprosta-trans-13-enoate was heated with 90% acetic acid to give methyl 15-acetoxy-9-oxoprosta-10,trans-13-dienote.

Following the procedure of Example 6, butyl $11\alpha$-15-diacetoxy-9-oxoprosta-trans-13-enoate;
allyl $11\alpha,15$-dibenzoyloxy-9-oxoprosta-trans-13-enoate;
benzyl $11\alpha,15$-di-p-chlorophenoxyacetoxy-9-oxoprosta-trans-13-enoate;
methyl $11\alpha,15$-diacetoxy-9-oxoprosta-cis-5,trans-13-dienoate;
ethyl $11\alpha,15$-dibutyryloxy-9-oxoprosta-cis-5,trans-13,cis-17-trienoate;
propyl $11\alpha,15$-dipropionyloxy-9-oxoprostanoate; and decyl 11α,15-dicyclohexylcarbonyloxy-9-oxoprosta-cis-5,trans-13-dienoate;

are each transformed to the corresponding prostanoic acid derivative, i.e., butyl 15-acetoxy-9-oxoprosta-10,trans-13-dienoate;
allyl 15-benzoyloxy-9-oxoprosta-10,trans-13-dienoate;
benzyl 15-p-chlorophenoxyacetoxy-9-oxoprosta-10,trans-13-dienoate;
methyl 15-acetoxy-9-oxoprosta-cis-5,10,trans-13-trienoate;
ethyl 15-butyryloxy-9-oxoprosta-cis-5,10,trans-13,cis-17-tetraenoate;
propyl 15-propionyloxy-9-oxoprosta-10-enoate; and
decyl 15-cyclohexylcarbonyloxy-9-oxoprosta-cis-5,10,trans-13-trienoate, respectively.

Also following the procedure of Example 6, isobutyl 11α,15-dihydroxy-9-oxoprosta-trans-13-enoate;
cyclohexyl 11α,15-dihydroxy-9-oxoprosta-trans-13-enoate;
2-phenylethyl 11α,15-dihydroxy-9-oxoprosta-cis-5,trans-13-dienoate;
α-naphthylmethyl 11α,15-dihydroxy-9-oxoprosta-cis-5,trans-13-dienoate;
hexyl 11α,15-dihydroxy-9-oxoprosta-cis-5-trans-13,cis-17-trienoate;
crotyl 11α,15-dihydroxy-9-oxoprosta-cis-5,trans-13,cis-17-trienoate;
methyl 11α,15-dihydroxy-9-oxoprostanoate; and
benzyl 11α,15-dihydroxy-9-oxoprostanoate, are each transformed to the corresponding prostanoic acid derivative, i.e., isobutyl 15-hydroxy-9-oxoprosta-10,trans-13-dienoate;
cyclohexyl 15-hydroxy-9-oxoprosta-10,trans-13-dienoate;
2-phenylethyl 15-hydroxy-9-oxoprosta-cis-5,10-trans-13-trienoate;
α-naphthylmethyl 15-hydroxy-9-oxoprosta-cis-5,10-trans-13-trienoate;
hexyl 15-hydroxy-9-oxoprosta-cis-5,10,trans-13-cis-17-tetraenoate;
crotyl 15-hydroxy-9-oxoprosta-cis-5,10,trans-13,cis-17-tetraenoate;
methyl 15-hydroxy-9-oxoprosta-10-enoate; and
benzyl 15-hydroxy-9-oxoprosta-10-enoate, respectively.

Also following the procedure of Example 6,

11α,15-diacetoxy-9-oxoprosta-trans-13-enoic acid;
11α,15-di-p-nitrobenzoyloxy-9-oxoprosta-trans-13-enoic acid;
11α,15-di-cyclopentylcarbonyloxy-9-oxoprosta-cis-5,trans-13-dienoic acid;
11α,15-di-(2-benzofurancarbonyloxy)-9-oxoprosta-cis-5,trans-13-dienoic acid;
11α,15-di-(2-naphthoyloxy)-9-oxoprosta-cis-5,trans-13-cis-17-trienoic acid;
11α,15-di-p-chlorophenoxyacetyloxy-9-oxoprosta-cis-5,trans-13,cis-17-trienoic acid;
11α,15-dipropionyloxy-9-oxoprostanoic acid; and
11α,15-di-p-methoxybenzoyloxy-9-oxoprostanoic acid, are each transformed to the corresponding prostanoic acid derivative, i.e., 15-acetoxy-9-oxoprosta-10,trans-13-dienoic acid;
15-p-nitrobenzoyloxy-9-oxoprosta-10,trans-13-dienoic acid;
15-cyclopentylcarbonyloxy-9-oxoprosta-cis-5,10,trans-13-trienoic acid;
15-(2-benzofurancarbonyloxy)-9-oxoprosta-cis-5,10,trans-13-trienoic acid;
15-(2-naphthoyloxy)-9-oxoprosta-cis-5,10,trans-13,cis-17-tetraenoic acid;
15-p-chlorophenoxyacetyloxy-9-oxoprosta-cis-5,10,trans-13,cis-17-tetraenoic acid;
15-propionyloxy-9-oxoprosta-10-enoic acid; and
15-p-methoxybenzoyloxy-9-oxoprosta-10-enoic acid, respectively.

EXAMPLE 7

Methyl 15-hydroxy-9-oxoprostanoate and methyl 15-hydroxy-9-oxoprosta-trans-13-enoate A solution of methyl 15-hydroxy-9-oxoprosta-10,trans-13-dienoate (400 mg.) in 25 ml. of ethyl aceate was shaken with hydrogen at about one atmosphere pressure in the presence of 5% palladium on charcoal. About 50 mg. of the palladium catalyst was present initially. Additional catalyst was added twice during the hydrogenation (125 mg. total catalyst was used). After about 140 minutes, 28 ml. of hydrogen had been absorbed (1 molecular equivalent was 24 ml.). The hydrogenation was then stopped and the catalyst was removed by filtration. The filtrate was evaporated to give a gummy residue, which was chromatographed on a 35-g. column of silica gel (0.05–0.2 mm. chromatography grade of E. Merck, Darmstadt, Germany) made up in 20% ethyl acetate-cyclohexane, eluting first with 250 ml. of 20% and then with 350 ml. of 33% ethyl acetate in cyclohexane, collecting 35 ml. fractions. The latter 20% ethyl acetate eluates and the 33% ethyl acetate eluates were combined and evaporated to give 220 mg. of a residue which showed no 10,11-double bond infrared absorption (at 1590 cm.$^{-1}$) and diminished 13,14-double bond infrared absorption (at 970 cm.$^{-1}$). The latter residue was chromatographed on 25 g. of magnesium trisilicate (60–100 mesh Florisil of The Floridin Company) and eluted with 5% acetone in a mixture of isomeric hexanes (Skellysolve B of The Skelly Oil Company), collecting 50 ml. fractions. Fractions 8–10 were combined and evaporated to give essentially pure methyl 15-hydroxy-9-oxoprostanoate; single spot with $R_f$ 0.55 by thin layer chromatography on silica gel and an ethyl acetatecyclohexane (50:50) solvent system; no significant ultraviolet absorption; no infrared absorption at 970 cm.$^{-1}$ and 1590 cm.$^{-1}$. N.M.R. spectrum showed no peak corresponding to vinyl protons and a peak at 53 c.p.s. corresponding to the C–20 methyl group.

Eluate fractions 11–18 from the above-described chromatogram were combined and evaporated to give a residue which was rechromatographed on magnesium trisilicate and eluted with 5% acetone in a mixture of isomeric hexanes, collecting 25-ml. fractions. Fractions 5–8 from the latter chromatogram were combined and evaporated to give additional essentially pure methyl 15-hydroxy-9-oxoprostanoate (total was 117 mg.). Fractions 11–15 from the latter chromatogram were combined and evaporated to give 17 mg. of essentially pure methyl 15-hydroxy-9-oxoprosta-trans-13-enoate; single spot with $R_f$ 0.49 by thin layer chromatography on silica gel and an ethyl acetate-cyclohexane (50:50) solvent system; no significant ultraviolet absorption; infrared absorption at 970 cm.$^{-1}$ but none at 1590 cm.$^{-1}$.

Following the procedure of Example 7, catalytic hydrogenation of 15 - hydroxy-9-oxoprosta-10,trans-13-dienolic acid gives a mixture of 15-hydroxy-9-oxoprostanoic acid and 15-hyroxy-9-oxoprosta-trans-13-enoic acid. Also following the procedure of Example 7, catalytic hydrogenation of the isobutyl, hexyl, cyclohexyl, 2-phenylethyl, and 4-(1-naphthyl)butyl esters of 15-hydroxy-9-oxoprosta-10,trans-13-dienoic acid gives mixtures of the corresponding esters of 15-hydroxy-9-oxoprostanoic acid and 15-hydroxy-9-oxoprosta-trans13-enoic acid. Also following the procedure of Example 7, catalytic hydrogenation of 15-acetoxy-9-oxoprosta-10,trans-13-dienoic acid;
15-benzoyloxy-9-oxoprosta-10,-trans-13-dienoic acid;
15-cyclopentylcarbonyloxy-9-oxoprosta-10-trans-13-dienoic acid;

15-(2-benzofurancarbonyloxy)-9-oxoprosta-10,trans-13-dienoic acid;
15-p-chlorophenoxyacetyloxy-9-oxoprosta-10,-trans-13-dienoic acid;
methyl 15-acetoxy-9-oxoprosta-10,-trans-13-dienoic; and
cyclopentylmethyl 15-benzoyloxy-9-oxoprosta-10,-trans-13-dienoate.

there are obtained mixtures of 15-acetoxy-9-oxoprostanoic acid and 15-acetoxy-9-oxoprosta-trans-13-enoic acid;
15-benzoyloxy-9-oxoprostanoic aicd and 15-benzoyloxy-9-oxoprosta-trans-13-enoic acid;
15-cyclopentylcarbonyloxy-9-oxoprostanoic acid and 15-cyclopentylcarbonyloxy-9-oxoprosta-trans-13-enoic acid;
15-(2-benzofurancarbonyloxy)-9-oxoprostanoic acid and 15-(2-benzoylfurancarbonyloxy)-9-oxoprosta-trans-13-enoic acid;
15-p-chlorophenoxyacetyloxy-9-oxoprostanoic acid and 15-p-chlorophenoxyacetyloxy-9-oxoprostra-trans-13-enoic acid;
methyl 15-acetoxy-9-oxoprostanoate and methyl 15-acetoxy-9-oxoprosta-trans-13-enoate; and
cyclopentylmethyl 15-benzoyloxy-9-oxoprostanoate and cyclopentylmethyl 15-benzoyloxy-9-oxoprosta-trans-13-enoate, respectively.

EXAMPLE 8

9,15-dihydroxyprostanoic acid

A suspension of sodium borohydride (900 mg.) in 100 ml. of methanol at about 5° to 10° C. was added gradually with stirring during 2 minutes to a solution of 15-hydroxy-9-oxoprostanoic acid (300 mg.) in 30 ml. of methanol at about 0° to 5° C. Stirring was continued at 0° to 5° C. for 20 minutes. The reaction mixture was then allowed to warm to 25° C., and was stirred at that temperature for one hour. The resulting mixture was then concentrated by evaporation to ⅔ of its original volume, mixed with 25 ml. of water, and evaporated further to remove the methanol. The aqueous solution which resulted was acidified with dilute hydrochloric acid and extracted three times with diethyl ether. The diethyl ether extracts were combined, washed with water, dried, and evaporated to give 250 mg. of 9,15-dihydroxyprostanoic acid in the form of a partially crystalline residue.

A small amount of the 9,15-dihydroxyprostanoic acid product was subjected to thin layer chromatography on silica gel, using methanol-acetic acid-chloroform (5:5:90) as solvent system. Two blue-grey spots of about equal size and intensity on heating the thin layer chromatogram with concentrated sulfuric acid indicated the presence of two isomeric (epimeric) 9,15-dihydroxyprostanoic acids in approximately equal amounts.

The mixture of isomeric acids was subjected to reversed phase partition chromatography on silanized diatomaceous earth (Gas Chrom CLZ 100/200 mesh, a product of Applied Science Labs., State College, Pa.), using methanol-water (516 ml.-684 ml.) as the mobile phase and isooctanol-chloroform (60 ml.-60 ml.) as the stationary phase The column support (500 g.) was mixed with 45 ml. of stationary phase, and was then packed into column form as a slurry with mobile phase. The mixture of isomeric 9,15-dihydroxyprostanic acids was dissolved in 15 ml. of stationary phase and mixed with an additional 12 g. of the column support, and the resulting slurry was poured onto the column. The column was then eluted with mobile phase, 50-ml. fractions of eluate being collected.

Eluate fractions 13–24 were combined and evaporated to give essentially pure 9β,15-dihydroxyprostanoic acid. Eluate fractions 28–37 were combined and evaporated to give essentially pure 9α,15-dihydroxyprostanoic acid.

Following the procedure of Example 8, 15-hydroxy-9-oxoprosta-trans-13-enoic acid;
15-hydroxy-9-oxoprosta-10,trans-13-dienoic acid;
15-hydroxy-9-oxoprosta-10-enoic acid;
15-hydroxy-9-oxoprosta-cis-5,10,trans-13-trienoic acid; and
15-hydroxy-9-oxoprosta-cis-5,10-trans-13,cis-17-tetraenoic acid are each transformed by sodium borohydride reduction to mixtures of the 9-alpha- and 9-beta-forms of 9,15-dihydroxyprosta-trans-13-enoic acid;
9,15-dihyroxyprosta-10,trans-13-dienoic acid;
9,15-dihydroprosta-10-enoic acid;
9,15-dihydroxyprosta-cis-5,10-trans-13-trienoic acid; and
9,15-dihydroxyprosta-cis-5,10-trans-13,cis-17-tetraenoic acid; respectively.

Also following the chromatographic separation procedure of Example 8, the alpha and beta isomer of each pair are separated.

Also following the procedure of Example 8, 15-acetoxy-9-oxoprostanoic acid;
15-acetoxy-9-oxoprosta-trans-13-enoic acid;
15-acetoxy-9-oxoprosta-10,trans-13-dienoic acid;
15-acetoxy-9-oxoprosta-10-enoic acid;
15-acetoxy-9-oxoprosta-cis-5,10-trans-13-trienoic acid; and
15-acetoxy-9-oxoprosta-cis-5,10-trans-13,cis-17-tetraenoic acid are each transformed by sodium borohydride reduction to mixtures of the 9 alpha- and 9-beta-forms of the corresponding 9-hydroxy-15-acetoxyprostanoic acid derivatives. The alpha and beta isomer of each pair are then separated by reversed phase partition chromatography.

EXAMPLE 9

Methyl 15-hydroxy-9-oxoprosta-10-,trans-13-dienoate

Essentially pure 15-hydroxy-9-oxoprosta-10,trans-13-dienoic acid (2 mg.) was dissolved in a mixture of methanol and diethyl ether. A diethyl ether solution of diazomethane (about 200 mg.) was added, and the mixture was allowed to stand at about 25° C. for 5 minutes. The reaction mixture was then evaporated to dryness to give methyl 15-hydroxy-9-oxoprosta-10,trans-13-dienoate, with substantially the same properties as that prepared by the above alternative route.

Following the procedure of Example 9 but using in place of diazomethane, diazoethane; diazobutane; 1-diazo-2 - ethylhexane; cyclohexyldiazomethane; phenyldiazomethane; and diazopropene, there are obtained the ethyl, butyl, 2-ethylhexyl, cyclohexylmethyl, benzyl, and allyl esters, respectively, of 15-hydroxy-9-oxoprosta-10,trans-13-dienoic acid. In the same manner, essentially pure 15-hydroxy-9-oxoprosta-10-enoic acid,
15-dihydroxy-9-oxoprosta-cis-5,10,trans-13-trienoic acid,
15-hydroxy-9-oxoprosta-cis-5,10-trans-13,cis-17-tetraenoic acid,
15-hydroxy-9-oxoprostanoic acid,
15-hydroxy-9-oxoprosta-trans-13-enoic acid,
9,15-dihydroxyprostanoic acid,
9α,15-dihydroxyprostanoic acid,
9β,15-dihydroxyprostanoic acid,
9,15-dihydroxyprosta-trans-13-enoic acid,
9,15-dihydroxyprosta-10,trans-13-dienoic acid,
9,15-dihydroxyprosta-10-enoic acid,
9,15-dihydroxyprosta-cis-5,10-trans-13-trenoic acid, and
9,15-dihydroxyprosta-cis-5,10,trans-13,cis-17-tetraenoic acid, are each transformed to the corresponding methyl, ethyl, butyl, 2-ethylhexyl, cyclohexylmethyl benzyl, and allyl esters.

EXAMPLE 10

Methyl 15-acetoxy-9-oxoprosta-10,trans-12-dienoate

Methyl 15 - hydroxy-9-oxoprosta-10,trans-13-dienoate (2 mg.) was mixed with acetic anhydride (0.5 ml.) and pyridine (0.5 ml.). The resulting mixture was allowed to stand at 25° C. for 18 hours. The reaction mixture was then cooled with ice, diluted with water, and acidified with dilute hydrochloric acid to pH 1. That mixture was then extracted three times with diethyl ether. The diethyl ether extracts were combined, and washed successively with dilute aqueous hydrochloric acid, dilute sodium bicarbonate solution, and water. The ether was then evaporated to give methyl 15-acetoxy-9-oxoprosta-10,trans-13-dienoate with substantially the same properties as that obtained in Example 6.

Following the procedure of Example 10, methyl 15-hydroxy-9-oxoprosta-10-enoate;
methyl 15-hydroxy-9-oxoprosta-cis-5,10,trans-13-trienoate;
methyl 15-hydroxy-9-oxoprosta-cis-5,110,trans-13,cis-17-tetraenoate;
methyl 15-hydroxy-9-oxoprostanoate;
methyl 15-hydroxy-9-oxoprosta-trans-13-enoate;
methyl 9,15-dihydroxyprostanoate;
methyl 9α,15-dihydroxyprostanoate;
methyl 9β,15-dihydroxyprostanoate;
methyl 9,15-dihydroxyprosta-trans-13-enoate;
methyl 9,15-dihydroxyprosta-10,trans-13-dienoate;
methyl 9,15-dihydroxyprosta-10-enoate;
methyl 9,15-dihydroxy-cis-5,10,trans-13-trienoate; and
methyl 9,15-dihydroxyprosta-cis-5,10,trans-13,cis-17-tetraenoate, were transformed separately to methyl 15-acetoxy-9-oxoprosta-10-enoate;
methyl 15-acetoxy-9-oxoprosta-cis-5,10,trans-13-trienoate;
methyl 15-acetoxy-9-oxoprosta-cis-5,10,trans-13,cis-17-tetranoate;
methyl 15-acetoxy-9-oxoprostanoate;
methyl 15-acetoxy-9-oxoprosta-trans-13-enoate;
methyl 9,15-diacetoxyprostanoate;
methyl 9α,15-diacetoxyprostanoate;
methyl 9β,15-diacetoxyprostanoate;
methyl 9,15-diacetoxyprosta-trans-13-enoate;
methyl 9,15-diacetoxyprosta-10,trans-13-dienoate;
methyl 9,15-diacetoxyprosta-10-enoate;
methyl 9,15-diacetoxyprosta-cis-5,10,trans-13-trienoate; and
methyl 9,15-diacetoxyprosta-cis-5,10,trans-13,cis-17-tetraenoate, respectively.

Also following the procedure of Example 10, but substituting for the acetic anhydride, propionic anhydride; butyl anhydride; acrylic anhydride; crotonic anhydride; cyclohexanecarboxylic anhydride; benzoic anhydride; naphthoic anhydride; p-chlorophenoxyacetic anhydride; and furoic anhydride, there are obtained the corresponding 15-carboxyacyl derivatives of methyl 15-hydroxy-9-oxoprosta-10,trans-13-dienoate. In a similar manner, the same 15-carboxyacyl derivatives of methyl 15-hydroxy-9-oxoprosta-10-enoate;
methyl 15-hydroxy-9-oxoprosta-cis-5,10,trans-13-trienoate;
methyl 15-hydroxy-9-oxoprosta-cis-5,10,trans-13,cis-17-tetraenoate;
methyl 15-hydroxy-9-oxoprostanoate;
methyl 15-hydroxy-9-oxoprosta-trans-13-enoate;
methyl 9,15-dihydroxyprostanoate;
methyl 9α,15-dihydroxyprostanoate;
methyl 9β,15-dihydroxyprostanoate;
methyl 9,15-dihydroxyprosta-trans-13-enoate;
9,15-dihydroxyprosta-10,trans-13-dienoate;
methyl 9,15-dihydroxyprosta-10-enoate; and
methyl 9,15-dihydroxyprosta-cis-5,10,trans-13,cis-17-tetraenoate are prepared. In a similar manner, each of the other esters of the above-mentioned 15-hydroxyprostanoic acid and 9,15-dihydroxyprostanoic acid derivatives is reacted with acetic anhydride or with each of the other above-mentioned anhydrides to give the corresponding 15-carboxyacylprostanoic acid and 9,15-dicarboxyacylprostanoic acid derivatives.

Also following the procedure of Example 10, essentially pure 15-hydroxy-9-oxoprosta-10-enoic acid;
15-hydroxy-9-oxoprosta-10,trans-13-dienoic acid;
15-hydroxy-9-oxoprosta-cis-5,10,trans-13-trienoic acid;
15-hydroxy-9-oxoprosta-cis-5,10,trans-13,cis-17-tetraenoic acid;
15-hydroxy-9-oxoprostanoic acid;
15-hydroxy-9-oxoprosta-trans-13-enoic acid;
9,15-dihydroxyprostanoic acid;
9α,15-dihydroxyprostanoic acid;
9β,15-dihydroxyprostanoic acid;
9,15-dihydroxyprosta-trans-13-enoic acid;
9,15-dihydroxyprosta-10,trans-13-dienoic acid;
9,15-dihydroxyprosta-10-enoic acid;
9,15-dihydroxyprosta-cis-5,10,trans-13-trienoic acid; and
9,15-dihydroxyprosta-cis-5,10,trans-13,cis-17-tetraenoic acid are each separately reacted with acetic anhydride or with each of the above-mentioned anhydrides to give the corresponding 15-carboxyacyl or 9,15-dicarboxyacyl derivative. In these cases, the sodium bicarbonate wash is omitted. Then, following the procedure of Example 9, each of those unsaturated 15-carboxyacyloxy prostanoic acids is separately reacted with diazomethane or with each of the other above-mentioned diazohydrocarbons to produce the same esterified 15-carboxyacyl or 9,15-dicarboxyacyl derivatives produced by the other alternative route, i.e., first esterification and then carboxyacylation. Another route to these same compounds is also as given above, i.e., in Example 6, for example.

Also following the procedure of Example 10, 15-acetoxy-9-hydroxyprostanoic acid;
15-acetoxy-9-hydroxyprosta-trans-13-enoic acid;
15-acetoxy-9-hydroxyprosta-10,trans-13-dienoic acid;
15-acetoxy-9-hydroxyprosta-10-enoic acid;
15-acetoxy-9-hydroxyprosta-cis-5,10,trans-13-trienoic acid; and
15-acetoxy-9-hydroxyprosta-cis-5,10,trans-13,cis-17-tetraenoic acid are each separately reacted with acetic anhydride to give the corresponding 9,15-diacetoxyprostanoic acid derivatives with substantially the same properties as those described above and prepared by diacetylation of the corresponding 9,15-dihydroxy-prostanoic acid derivatives. Further following the procedure of Example 10 but using each of the other above mentioned anhydrides in place of acetic anhydride, each of these 15-acetoxy-9-hydroxyprostanoic acid derivatives is transformed to the corresponding 15-acetoxy - 9 - carboxyacyloxyprostanoic acid derivative.

EXAMPLE 11

15-hydroxy-9-oxoprosta-10-enoic acid 15-hydroxy-9-oxoprosta-10,trans - 13 - dienoic acid (50 mg.) was dissolved in 10 ml. of absolute ethanol. Air was flushed from the reaction vessel with a stream of dry nitrogen gas, and was excluded thereafter by maintaining a slight positive pressure of nitrogen in the reaction vessel.

A suspension of 50 mg. of disodium azodiformate in 5 ml. of absolute ethanol was added, and the resulting mixture was stirred at about 25° C. and made acid with a few drops of glacial acetic acid. Stirring at 25° C. was continued for 8 hours. The reaction mixture was then evaporated to dryness. The resulting residue was dissolved in a mixture of diethyl ether and water. The diethyl ether layer was separated, dried with anhydrous sodium sulfate, and evaporated at reduced pressure to give essentially pure 15-hydroxy-9-oxoprosta-10-enoic acid with substantially the same properties as the material prepared according to Example 4.

Following the procedure of Example 11 but using separately in place of the 15-hydroxy-9-oxoprosta-10,trans-13-dienoic acid, 15-hydroxy-9-oxoprosta-cis - 5,10,trans - 13 - trienoic acid and 15-hydroxy-9-oxoprosta-cis-5,10,trans-13,cis-17-tetraenoic acid, and using appropriately larger amounts of disodium azodiformate, the same product, 15-hydroxy-9-oxoprosta-10-enoic acid is obtained.

Also following the procedure of Example 11, methyl 15-hydroxy-9-oxoprosta-10,trans-13-dienoate, methyl 15-acetoxy-9-oxoprosta-10,trans-13-dienoate, 15 - acetoxy-9-oxoprosta-10,trans-13-dienoic acid, and each of the other above-mentioned esters, acylates, and ester-acylates of 15-hydroxy-9-oxoprosta-10,trans-13-dienoic acid, 15-hydroxy-9-oxoprosta-cis-5,10,trans - 13 - trienoic acid, and 15-hydroxy-9-oxoprosta-cis - 5,10,trans - 13,cis - 17 - tetraenoic acid is transformed to the corresponding ester, acylate, or ester-acylate of 15-hydroxy-9-oxoprosta-10-enoic acid.

EXAMPLE 12

Sodium 15-hydroxy-9-oxoprosta-10,trans-13-dienoate

Essentially pure 15-hydroxy-9-oxoprosta-10,trans-13-dienoic acid (2 mg.) was dissolved in 3 ml. of water-ethanol 1:1. The solution was cooled to about 10° C. and was neutralized with an equivalent amount of 0.1 N aqueous sodium hydroxide solution. Evaporation to dryness gave essentially pure sodium 15-hydroxy - 9 - oxoprosta - 10, trans-13-dienoate.

Following the procedure of Example 12 but using in place of the essentially pure 15-hydroxy-9-oxoprosta-10, trans-13-dienoic acid, essentially pure 15-hydroxy-9-oxoprosta-10-enoic acid;
essentially pure 15-hydroxy-9-oxoprosta-cis-5,10,trans-13-trienoic acid;
essentially pure 15-hydroxy-9-oxoprosta-cis-5,10,trans-13,cis-17-tetraenoic acid;
15-hydroxy-9-oxoprostanoic acid;
15-hydroxy-9-oxoprosta-trans-13-enoic acid;
9,15-dihydroxyprostanoic acid;
$9\alpha$,15-dihydroxyprostanoic acid;
$9\beta$,15-dihydroxyprostanoic acid;
9,15-dihydroxyprosta-trans-513-enoic acid;
9,15-dihydroxyprosta-10,trans-13-dienoic acid;
9,15-dihydroxyprosta-10-enoic acid;
9,15-dihydroxyprosta-cis-5,10,trans-13-trienoic acid;
9,15-dihydroxyprosta-cis-5,10,trans-13,cis-17-tetraenoic acid;
15-acetoxy-9-oxoprosta-10,trans-13-dienoic acid;
15-crotonyloxy-9-oxoprosta-10-enoic acid;
15-benzoyloxy-9-oxoprosta-cis-5,10,trans-13-trienoic acid;
15-cyclohexylcarbonyloxy-9-oxoprosta-cis-5,10,trans-13, cis-17-tetraenoic acid; and
9,15-diacetoxyprostanoic acid, there are obtained the corresponding sodium salts.

Also following the procedure of Example 12 but using potassium hydroxide, calcium hydroxide, tetramethylammonium hydroxide, and benzyltrimethylammonium hydroxide, there are obtained the corresponding salts of essentially pure 15 - hydroxy - 9 - oxoprosta-10,trans-13-dienoic acid.

An essentially pure compound within the scope of Formulas II, VI, VII, and VIII is a compound essentially free of water and other ordinary diluents, essentially free of compounds with a C–11 hydroxy moiety, essentially free of other compounds of greater or lesser carbon-carbon unsaturation, and essentially free of the pyrogens, antigens, tissue debris, and the like usually associated with a naturally-occurring substance such as $PGE_1$. In addition, an essentially pure compound within the scope of Formulas II and VI is one essentially free of compounds with a C–9 hydroxy moiety, while an essentially pure compound within the scope of Formulas VII and VIII is one essentially free of compounds with a C–9 oxo moiety. For example, 15-hydroxy-9-oxoprosta-cis-5,10,trans-13-trienoic acid is essentially pure when it is essentially free of water and other diluents such as acetic acid, essentially free of $PGE_2$, and essentially free of 15-hydroxy - 9 - oxoprosta - 10,trans-13-dienoic acid, 15-hydroxy - 9 - oxoprosta-cis-5,10,trans-13,cis-17-tetraenoic acid, and 9,15 - dihydroxyprosta-cis-5,10,trans-13-trienoic acid.

We claim:

1. A prostanoic acid derivative of the formula:

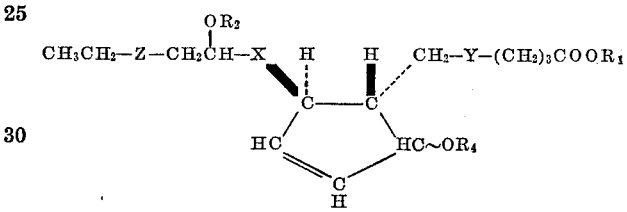

wherein X, Y, and Z are —$CH_2CH_2$—, wherein X is trans-CH=CH—, and Y and Z are —$CH_2CH_2$—, or wherein X is trans-CH=CH—, Y is cis-CH=CH—, and Z is —$CH_2CH_2$— or cis-CH=CH—, wherein $R_1$ is hydrogen, lower alkyl, or a pharmacologically acceptable cation, wherein $R_2$ and $R_4$ are each hydrogen or lower alkanoyl, with the proviso that when $R_4$ is lower alkanoyl, $R_2$ is also lower alkanoyl, and wherein ~ is a generic expression denoting an alpha or a beta configuration for the $OR_4$ moiety.

2. A compound according to claim 1 wherein the $OR_4$ moiety is in alpha configuration.

3. A compound according to claim 1 wherein the $OR_4$ moiety is in beta configuration.

4. A compound according to claim 2 wherein $R_1$ is lower alkyl, and $R_2$ and $R_4$ are both hydrogen.

5. A compound according to claim 3 wherein $R_1$ is lower alkyl, and $R_2$ and $R_4$ are both hydrogen.

6. A compound according to claim 2 wherein $R_1$, $R_2$, and $R_4$ are hydrogen.

7. A compound according to claim 3 wherein $R_1$, $R_2$, and $R_4$ are hydrogen.

8. $9\alpha$,15-dihydroxyprosta-10-enoic acid, a compound according to claim 1 wherein X, Y, and Z are

—$CH_2CH_2$—, $R_1$, $R_2$, and $R_4$ are hydrogen, and ~ indicates alpha configuration for $OR_4$.

9. $9\alpha$,15 - dihydroxyprosta-10,trans-13-dienoic acid, a compound according to claim 1 wherein X is trans-CH=CH—, Y and Z are —$CH_2CH_2$—, $R_1$, $R_2$, and $R_4$ are hydrogen, and ~ indicates alpha configuration for $OR_4$.

10. $9\alpha$,15 - dihydroxyprosta-cis-5,10,trans-13-trienoic acid, a compound according to claim 1 wherein X is trans-CH=CH—, Y is cis-CH=CH—, and Z is —$CH_2CH_2$—, $R_1$, $R_2$ and $R_4$ are hydrogen, and ~ indicates alpha configuration for $OR_4$.

11. 9α,15 - dihydroxyprosta-cis-5,10,trans-13,cis - 17-tetraenoic acid, a compound according to claim 1 wherein X is trans-CH=CH—, Y and Z are cis-CH=CH—, $R_1$, $R_2$, and $R_4$ are hydrogen, and ~ indicates alpha configuration for $OR_4$.

References Cited

UNITED STATES PATENTS 3,432,341  3/1969  Bagle et al. _____ 260—408

OTHER REFERENCES

Caton et al.: Tetrahedron Letters, 773 (1972).

LORRAINE A. WEINBERGER, Primary Examiner

R. GERSTL, Assistant Examiner

U.S. Cl. X.R.

260—211 R, 247.2 R, 268 R, 293.05, 326.2, 295 R, 347.5, 410, 429.9, 430, 439 R, 418 R, 468 R, 471 R, 473 G, 476 R, 469, 485 G, 488 R, 475 P, 501.1, 501.15, 486 R, 501.17, 501.2, 514 D; 424—305, 311, 317

UNITED STATES PATENT OFFICE
CERTIFICATE OF CORRECTION

Patent No. 3,729,502    Dated April 24, 1973

Inventor(s) Philip F. Beal, III and John E. Pike

It is certified that error appears in the above-identified patent and that said Letters Patent are hereby corrected as shown below:

Column 1, lines 20-25, Formula (I), that portion of the formula reading $-CH_2-CO$    should read    $-CH_2-COOH$ ;
    2   1                         2    1 lines 31-32, "Horton, Experientia, 21, 113 (965)." should read -- Horton, Experientia, 21, 113 (1965). --; lines 36-43, Formula (II), that portion of the formula reading $-Y-(CH_2)_5COOR_1$    should read    $-Y-(CH_2)_3COOR_1$ ;

line 51, "This Formula H" should read -- Thus Formula II --; lines 53-61, Formula (III), that portion of the formula reading

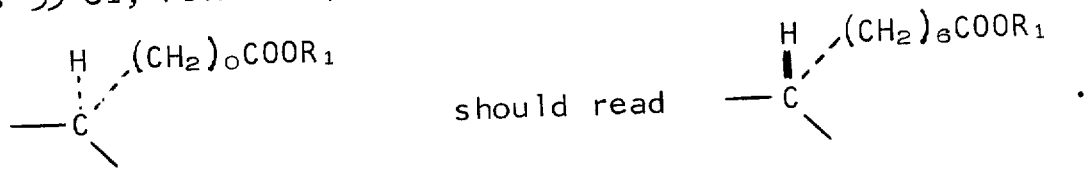

Column 2, lines 1-10, Formula (V), that portion of the formula reading

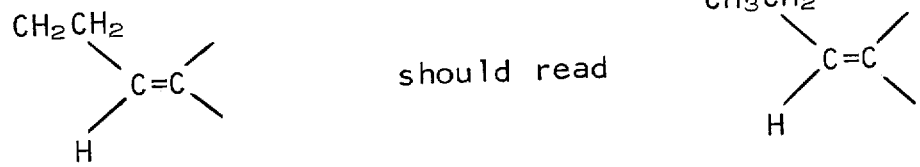

and

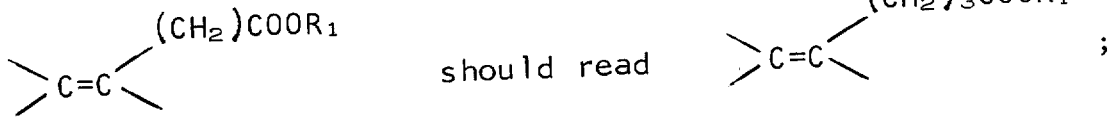

UNITED STATES PATENT OFFICE
CERTIFICATE OF CORRECTION

Patent No. 3,729,502    Dated April 24, 1973

Inventor(s) Philip F. Beal, III and John E. Pike

It is certified that error appears in the above-identified patent and that said Letters Patent are hereby corrected as shown below:

lines 30-35, Formula (VI), that portion of the formula reading

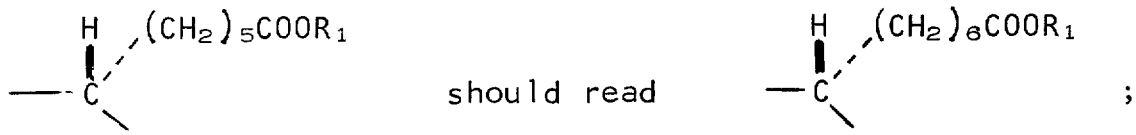

lines 61-68, Formula (VIII), that portion of the formula reading

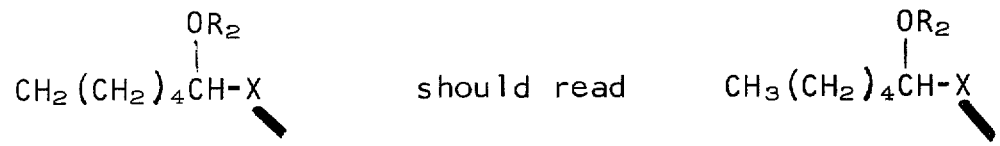

and

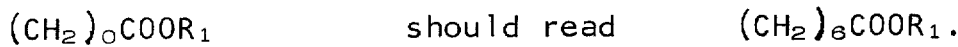

Column 3, lines 12-13, "one to about 40 carbon atoms." should read -- one to about 10 carbon atoms. --. Column 5, lines 5-13, Formula (IX), that portion of the formula reading

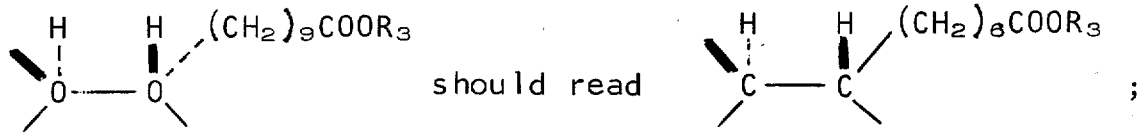

lines 17-25, Formula (X), that portion of the formula reading

and

UNITED STATES PATENT OFFICE
CERTIFICATE OF CORRECTION

Patent No. 3,729,502            Dated April 24, 1973

Inventor(s) Philip F. Beal, III and John E. Pike

It is certified that error appears in the above-identified patent and that said Letters Patent are hereby corrected as shown below:

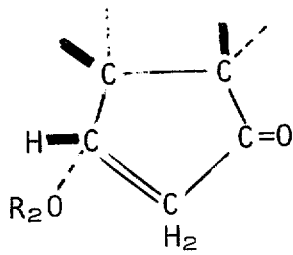  should read  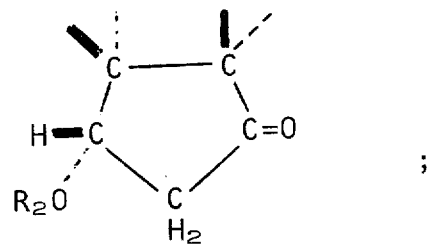 ;

line 29, "Y is cis-CH—CH—," should read -- Y is cis-CH=CH-, --. Column 8, line 18, "unsaturated $R_2$ and/or $R_2$ moieties" should read -- unsaturated $R_1$ and/or $R_2$ moieties --. Column 9, line 61, "The Formulas II, VI, VII, and VII prostanoic acid derivatives" should read -- The Formula II, VI, VII, and VIII prostanoic acid derivatives --. Column 11, line 17, "metal of ammonium," should read -- metal or ammonium, --. Column 15, line 59, "CLZ 100/200 mesh," should read -- CLZ 100/120 mesh, --. Column 16, line 15, "9,15-dihydroprosta-10-enoic acid;" should read -- 9,15-dihydroxyprosta-10-enoic acid;' --. Column 17, line 3, "-10,trans-12-dienoate" should read -- -10,trans-13-dienoate --; line 22, "-cis-5,110,trans-" should read -- -cis-5,10,trans- --; line 74, "9,15-dihydroxyprosta-10,trans-13-dienoate;" should read -- methyl 9,15-dihydroxyprosta-10,trans-13-dienoate; --. Column 19, line 56, "-trans-513-enoic acid;"

UNITED STATES PATENT OFFICE
CERTIFICATE OF CORRECTION

Patent No. 3,729,502  Dated April 24, 1973

Inventor(s) Philip F. Beal, III and John E. Pike

It is certified that error appears in the above-identified patent and that said Letters Patent are hereby corrected as shown below:

Should read -- -trans-13-enoic acid; --.

Signed and Sealed this twenty-sixth Day of July 1977

[SEAL]

Attest:

RUTH C. MASON
*Attesting Officer*

C. MARSHALL DANN
*Commissioner of Patents and Trademarks*